United States Patent Office 3,476,833
Patented Nov. 4, 1969

3,476,833
S-(2-AMINOETHYL)DITHIOPHOSPHATES AND PROCESS FOR THE PREPARATION THEREOF
Stanley J. Brois, Matawan, N.J., assignor to Esso Research and Engineering Company
No Drawing. Filed May 2, 1966, Ser. No. 546,543
Int. Cl. C07f 9/08, 9/16
U.S. Cl. 260—925                                      6 Claims

ABSTRACT OF THE DISCLOSURE

S-(2-aminoethyl)dithiophosphates are prepared in a suitable solvent at low temperatures by reacting an aziridine with a dithiophosphoric acid, e.g., a dialkyl dithiophosphoric acid. The resulting products have utility as pesticides, particularly as insecticides and nematocides.

---

The present invention relates to S-(2-aminoethyl)dithiophosphate salts, their method of preparation and their use as pesticides. In general, it concerns compounds having the following general formula:

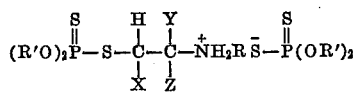

where R is H, alkyl, cycloalkyl or aryl and R' is alkyl or cycloalkyl, preferably $C_1$ to $C_{12}$ alkyl. The letters X, Y, and Z are the same or different and may be selected from the group consisting of hydrogen, alkyl or aryl radicals. In particular, this invention concerns novel compounds of the above formula, pesticidal compounds of the above formula, the process for preparing such compounds, pesticidal compositions comprising said compounds and methods for controlling pests employing such compounds.

Briefly, compounds of the present invention may be prepared by reacting an aziridine with dialkyl dithiophosphoric acid at low temperatures, e.g., between about $-40°$ and $25°$ C. in a suitable solvent such as ether, tetrahydrofuran, acetone, methanol, ethanol, etc. A preferred solvent is ether.

The term aziridine is employed herein as a generic term covering ethylenimine and ethylenimine derivatives. Aziridines suitable for use in the present invention may be represented by the following formula:

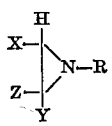

where R, X, Y and Z are as defined above. Examples of suitable aziridines include but are not limited to ethylenimine, N-methylaziridine, N-ethylaziridine, N-t-butylaziridine, N-n-butylaziridine, 2-methylaziridine, 2-ethylaziridine, 2,2-dimethylaziridine, 2-phenylaziridine, 2-phenyl-3-methylaziridine and N-aziridylalkyl amines, esters, amides, imides, carbamates, guanidines, ketones, hydrazones, semicarbazones, ureas and thioureas.

The dialkyl dithiophosphoric acid reactant employed in the process of the present invention has the formula $(R'O)_2PS_2H$ where R' is the same or different alkyl groups.

Preparations of dialkyl dithiophosphoric acids are well known in the art [U.S. Patent 1,893,018 (1928), British Patent 823,086 (1956)] and per se form no basis of the present invention. Dithiophosphate esters suitable for use in the present invention may be represented by the formula:

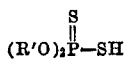

where R' may be methyl, ethyl, propyl, isopropyl, n-butyl, 2-methylpropyl, etc. Cyclic dithiophosphate esters derived from the reaction of $P_2S_5$ with 1,2 and 1,3-diols may also be employed in the present invention.

While it is not intended that the following limits the present invention in any respect, it is believed that the reaction between the aziridine and dialkyl dithiophosphoric acid proceeds according to the mechanism below.

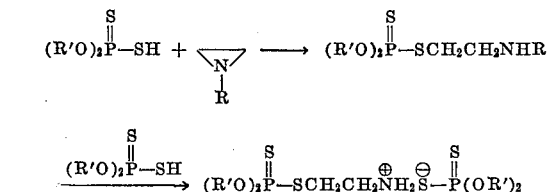

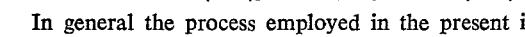

In general the process employed in the present invention involves the dropwise addition of an aziridine diluted in a suitable solvent, preferably ether, to two equivalents of dialkyl dithiophosphate diluted in ether at a temperature of about $-40°$ to $25°$ C., preferably about $25°$ C. Generally, the reaction product precipitates rapidly from the reaction medium. The precipitate may be filtered and recrystallized if desired from a suitable solvent, such as acetone or an acetone-ether mixture. High yields are obtained. The present invention can be further described by reference to the following illustrative examples. It is to be understood, however, the examples are not intended to limit the scope of the invention in any respect.

EXAMPLE 1

To a four-necked 2-liter round bottom flask equipped with stirrer, thermometer, addition funnel and condenser and containing 0.2 mole of diethyl dithiophosphate in approximately 500 ml. of ether maintained at about 10° C., was added dropwise 0.1 mole of ethylenimine dissolved in approximately 300 ml. of ether. A copious precipitate formed during the reaction and upon completion of the ethylenimine addition the precipitate was filtered and recrystallized from acetone. The process yielded approximately 95% of a white product, M.P. 100–101° C., which product exhibited infrared and n.m.r. spectra in good agreement with the theoretical structure. Analytical data for the product are shown in Table I.

EXAMPLE 2

As in Example 1, the N-methyl and N-ethyl derivatives were prepared by reaction of N-methylaziridine and N-ethylaziridine with diethyl dithiophosphoric acid in ether. The yields, melting points, and analytical data for the N-methyl and N-ethyl analogs are shown in Table I.

TABLE I
O,O-DIETHYL-S-(2-AMINOETHYL)DITHIOPHOSPHATES

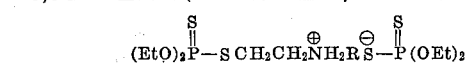

| R | Yield, percent | M.P. (° C.) | Analyses | | | |
|---|---|---|---|---|---|---|
| | | | C | N | S | P |
| H | 95 | 100–101 | 28.90 / 28.97 | 6.55 / 6.59 | 30.87 / 31.10 | [1] 14.91 / [2] 14.50 |
| Me | 97 | 74–75 | 30.75 / 30.26 | 3.26 / 3.24 | 29.86 / 29.62 | 14.42 / 14.01 |
| Et | 75 | 75 | 32.49 / 32.17 | 3.16 / 3.42 | 28.91 / 29.02 | 13.96 / 14.10 |

[1] Theory.
[2] Found.

The pesticidally active compounds of this invention can be employed singly or as a mixture with other pesticidal agents. Pesticidal compositions containing the novel compounds may be prepared by methods well known to those skilled in the art.

The compounds, depending upon their physical characteristics, can be applied as an undiluted spray or can be reduced to an impalpable powder and applied as an undiluted dust or mixed with a solid carrier such as clay, talc, limestone, bentonite, diatomaceous earth, fuller's earth, silica, pyrofillite, gypsum and other similar materials in finely comminuted form that are well known in the arts. The compounds of this invention can be applied as a spray in a liquid carrier or as a solution in a solvent or as a suspension in a nonsolvent. When applied as a spray in water it may be desirable to incorporate wetting and/or dispersing agents.

EXAMPLE 3

Compounds of the present invention were tested for pesticidal activity. The compounds tested included those specifically listed below as well as other compounds falling in the general category of S-(2-aminoethyl)-dithiophosphate salts described above.

Insecticidal activity was determined according to the following procedures.

Housefly tests

Fifty adults of the CSMA (Chemical Specialties Manufacturers' Association) strain are sprayed in a 2″ x 5″ diameter stainless steel cage faced on top and bottom with 14 mesh screen. Flies are retained in the cage in which they are sprayed for knockdown observations and 24 hour mortality determinations.

Pea aphid tests

Adult pea aphids are sprayed and transferred to sprayed pea plants and held for forty-eight hour mortality determinations.

Spider mite tests

Lima bean plants are infested with fifty to one hundred adults of the strawberry spider mite, *Tetranychus atlanticus*, prior to testing. The infested plants are dipped into the test material and held for five days.

The results of these tests are listed in Table II.

As is apparent from the above, the compounds of the present invention have utility as pesticides. As employed herein the term pesticide is intended to mean any chemical compound useful in pest control. Thus, the term "pesticide" includes compounds which function either as an insecticide, a fungicide, a herbicide, a nematocide or the like. A particular compound of the present invention may exhibit one or more different pesticidal activities. In addition to their primary utility as pesticides, compounds of the present invention may have other utilities such as reactive intermediates for the preparation of other pesticides and the like.

What is claimed is:

1. S-(2-aminoethyl)dithiophosphoric acid salts having the formula:

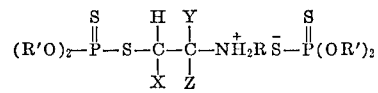

where R is a radical selected from the group consisting of H, alkyl, cycloalkyl, and aryl of up to 12 carbon atoms; R' is a radical selected from the group consisting of alkyl and cycloalkyl of up to 12 carbon atoms; and X, Y and Z are the same or different and are selected from the group consisting of H, alkyl, and aryl of up to 12 carbon atoms.

2. A compound having the formula:

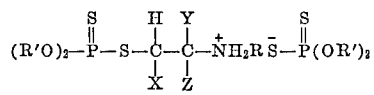

where R' is ethyl, R is H, and X, Y, and Z are each H.

3. A process for preparing S-(2-aminoethyl)dithiophosphate salts of the formula:

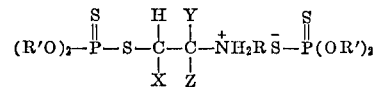

wherein R is a radical selected from the group consisting of H, alkyl, cycloalkyl and aryl; R' is a radical selected

TABLE II

| Compound | Dose, percent w. v. | Insect Specie, Percent Kill | | |
|---|---|---|---|---|
| | | Housefly | Pea Aphid | Spider Mite |
| $(C_2H_5O)_2\overset{S}{\overset{\|}{P}}-S(CH_2)_2\overset{\oplus}{NH_2}\overset{\ominus}{S}-\overset{S}{\overset{\|}{P}}(OC_2H_5)_2$ where R= | | | | |
| H | 0.35 | 46 | 50 | 100 |
| CH₃ | 0.35 | 92 | 100 | 100 |
| C₂H₅ | 0.35 | 100 | 100 | 100 |

Nematocidal activity was determined according to the following procedure.

Tomato transplants are grown in infected soil which has been thoroughly blended with the test compound. After several weeks the roots of the plants are examined for degree of root knot formation and the percent control of the test chemical observed by comparison of the knot counts on treated and untreated plants. The results are listed in Table III.

TABLE III.—COMPOUND $(C_2H_5O)_2\overset{S}{\overset{\|}{P}}-S(CH_2)_2\overset{\oplus}{NH_2}\overset{\ominus}{S}-\overset{S}{\overset{\|}{P}}(OC_2H_5)_2$ where R=                                       Percent Control
H _____ 94
C₃ _____ 90
C₂H₅ _____ 90 from the group consisting of alkyl and cycloalkyl; and X, Y, and Z are the same or different and are selected from the group consisting of H, alkyl and aryl; comprising reacting an ethylenimine of the formula:

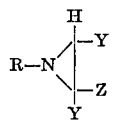

wherein R, X, Y, and Z are as defined above; with a dialkyl dithiophosphoric acid.

4. A process according to claim 3 wherein the temperature is between —40° C. and 25° C.

5. A process according to claim 3 wherein the reaction is conducted in the presence of an ether solvent.

6. A process according to claim 3 wherein the ethylenimine is N-ethyl ethylenimine and the dialkyl dithiophosphoric acid is diethyl dithiophosphoric acid.

References Cited

UNITED STATES PATENTS 3,002,014  9/1961  Dinsmore et al. _____ 260—925
3,392,215  7/1968  Simone et al. _____ 260—978

CHARLES B. PARKER, Primary Examiner
R. L. RAYMOND, Assistant Examiner

U.S. Cl. X.R.

260—978, 987; 424—199